US011423706B2

(12) United States Patent
Jordan et al.

(10) Patent No.: US 11,423,706 B2
(45) Date of Patent: Aug. 23, 2022

(54) REAL-TIME DATA ACQUISITION AND RECORDING DATA SHARING SYSTEM

(71) Applicant: Wi-Tronix, LLC, Bolingbrook, IL (US)

(72) Inventors: Lawrence B. Jordan, Bolingbrook, IL (US); Divya Dinesh, Bolingbrook, IL (US); Matthew D. Hamsmith, Bolingbrook, IL (US); Dan Alwin, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 626 days.

(21) Appl. No.: 16/431,466

(22) Filed: Jun. 4, 2019

(65) Prior Publication Data

US 2019/0304210 A1    Oct. 3, 2019

Related U.S. Application Data

(63) Continuation-in-part of application No. 15/907,486, filed on Feb. 28, 2018, now Pat. No. 10,445,951, and
(Continued)

(51) Int. Cl.
*G07C 5/00* (2006.01)
*G06F 13/14* (2006.01)
(Continued)

(52) U.S. Cl.
CPC .............. *G07C 5/008* (2013.01); *G06F 13/14* (2013.01); *G06F 16/00* (2019.01);
(Continued)

(58) Field of Classification Search
CPC ......... G07C 5/008; G07C 5/085; G06F 13/14; G06F 16/00; G06F 16/9566; G06F 12/02; G06F 2211/006; G08C 17/02
(Continued)

(56) References Cited

U.S. PATENT DOCUMENTS 5,065,321 A    11/1991   Bezos et al.
5,377,497 A    1/1995    Powell
(Continued)

FOREIGN PATENT DOCUMENTS

CA    2692415 A1 *   8/2011   ............ G07C 5/0858
CA    2689423        12/2015
(Continued)

OTHER PUBLICATIONS

Http://www.nbcnews.com/storyline/egyptair-crash/some-airlines-stream-black-box-data-cost-keeps-others-offline-n580966?cid=eml_onsite.

*Primary Examiner* — Fernando Hidalgo
(74) *Attorney, Agent, or Firm* — Mercedes V. O'Connor; Rockman Videbeck & O'Connor

(57) ABSTRACT

The real-time data acquisition and recording data sharing system works in conjunction with a real-time data acquisition and recording system and a viewer which provides real-time, or near real-time, access to a wide range of data, such as event and operational data, video data, and audio data to remotely located users such as asset owners, operators and investigators. The data sharing system allows the user to share data obtained from the data acquisition and recording system to remotely located users. The user can share data with remote recipient end users that have internet access and a modern web browser in a secure, controlled, tracked, and audited way. The user, instead of sharing files, shares a URL to the data. URL based data sharing enables the user to control, track, and audit sensitive data. The user will be able to share data to improve the safety of the world's transportation systems without fear of unauthorized data dissemination. The data can be shared by investigators using the web client with remotely located users without the need to locate and download the "black box."

21 Claims, 3 Drawing Sheets

Related U.S. Application Data a continuation-in-part of application No. 15/595,689, filed on May 15, 2017, now Pat. No. 10,410,441, and a continuation-in-part of application No. 15/595,712, filed on May 15, 2017, now Pat. No. 10,392,038, said application No. 15/907,486 is a continuation of application No. 15/595,650, filed on May 15, 2017, now Pat. No. 9,934,623.

(60) Provisional application No. 62/825,943, filed on Mar. 29, 2019, provisional application No. 62/680,907, filed on Jun. 5, 2018, provisional application No. 62/337,227, filed on May 16, 2016, provisional application No. 62/337,228, filed on May 16, 2016, provisional application No. 62/337,225, filed on May 16, 2016.

(51) Int. Cl.
*G06F 16/00* (2019.01)
*G06F 16/955* (2019.01)
*G08C 17/02* (2006.01)
*G07C 5/08* (2006.01)
*G06F 12/02* (2006.01)

(52) U.S. Cl.
CPC .......... *G06F 16/9566* (2019.01); *G06F 12/02* (2013.01); *G06F 2211/006* (2013.01); *G07C 5/085* (2013.01); *G08C 17/02* (2013.01)

(58) Field of Classification Search
USPC ........................................................ 707/705
See application file for complete search history.

(56) References Cited

U.S. PATENT DOCUMENTS

| | | | |
|---|---|---|---|
| 5,440,336 A | 8/1995 | Buhro et al. | |
| 5,455,684 A | 10/1995 | Fujiname et al. | |
| 5,627,508 A | 5/1997 | Cooper et al. | |
| 5,638,299 A | 6/1997 | Miller | |
| 6,109,532 A | 8/2000 | Schindler et al. | |
| 6,263,268 B1 | 7/2001 | Nathanson | |
| 6,308,044 B1 | 10/2001 | Wright et al. | |
| 6,392,692 B1 | 5/2002 | Monroe | |
| 6,496,777 B2 | 12/2002 | Tennison et al. | |
| 6,659,861 B1 | 12/2003 | Faris et al. | |
| 6,892,167 B2 | 5/2005 | Polan et al. | |
| 6,915,190 B2 | 7/2005 | Galasso | |
| 7,302,323 B2 | 11/2007 | Anderson et al. | |
| 7,440,848 B2 | 10/2008 | Anderson | |
| 7,640,083 B2 | 12/2009 | Monroe | |
| 7,755,479 B2 | 7/2010 | Webb, Sr. | |
| 7,756,617 B1 | 7/2010 | Cluff et al. | |
| 7,761,544 B2 | 7/2010 | Manasseh et al. | |
| 7,924,153 B1 | 4/2011 | Furey et al. | |
| 7,953,425 B2 | 5/2011 | Jordan | |
| 8,081,214 B2 | 12/2011 | Vanman et al. | |
| 8,589,994 B2 | 11/2013 | Monroe | |
| 8,612,170 B2 | 12/2013 | Smith et al. | |
| 8,625,878 B2 | 1/2014 | Haas et al. | |
| 8,646,060 B1* | 2/2014 | Ben Ayed | H04W 4/20 726/9 |
| 8,768,534 B2 | 7/2014 | Lentz | |
| 8,798,148 B2 | 8/2014 | Kostrzewski et al. | |
| 8,942,426 B2 | 1/2015 | Bar-Am | |
| 8,979,363 B2 | 3/2015 | Groeneweg et al. | |
| 9,003,052 B2 | 4/2015 | Holstein | |
| 9,031,791 B2 | 5/2015 | Nedilko et al. | |
| 9,049,433 B1 | 6/2015 | Prince | |
| 9,050,984 B2 | 6/2015 | Li et al. | |
| 9,191,053 B2 | 11/2015 | Ziarno et al. | |
| 9,235,765 B2 | 1/2016 | Bentley et al. | |
| 9,260,122 B2 | 2/2016 | Haas et al. | |
| 9,260,199 B2 | 2/2016 | Sundararajan et al. | |
| 9,285,294 B2 | 3/2016 | Jordan et al. | |
| 9,285,295 B2 | 3/2016 | Jordan et al. | |
| 9,313,276 B2 | 4/2016 | Pereira | |
| 9,346,476 B2 | 5/2016 | Dargy et al. | |
| 9,500,545 B2 | 11/2016 | McPherson | |
| 10,306,314 B2* | 5/2019 | McCarthy | H04N 21/4394 |
| 2002/0065077 A1* | 5/2002 | Matto | G06F 16/9577 455/466 |
| 2002/0184485 A1 | 12/2002 | Dray, Jr. et al. | |
| 2003/0093218 A1 | 5/2003 | Jones | |
| 2003/0152145 A1 | 8/2003 | Kawakita | |
| 2004/0027255 A1 | 2/2004 | Greenbaum | |
| 2004/0039504 A1 | 2/2004 | Coffee et al. | |
| 2004/0039614 A1 | 2/2004 | Maycotte et al. | |
| 2004/0260777 A1 | 12/2004 | Kolb et al. | |
| 2005/0240343 A1 | 10/2005 | Schmidt et al. | |
| 2005/0288903 A1 | 12/2005 | Jackson et al. | |
| 2006/0071783 A1 | 4/2006 | Culpepper et al. | |
| 2006/0276943 A1 | 12/2006 | Anderson et al. | |
| 2007/0076312 A1 | 4/2007 | Jordan | |
| 2008/0176583 A1 | 7/2008 | Brachet et al. | |
| 2008/0263103 A1 | 10/2008 | McGregor et al. | |
| 2009/0102638 A1 | 4/2009 | Olsen et al. | |
| 2009/0249076 A1* | 10/2009 | Reed | H04L 9/3228 713/168 |
| 2010/0023201 A1 | 1/2010 | Kinney et al. | |
| 2011/0077819 A1 | 3/2011 | Sakaguchi et al. | |
| 2012/0198335 A1* | 8/2012 | Huang | G06F 16/9535 715/716 |
| 2013/0274954 A1 | 10/2013 | Jordan et al. | |
| 2013/0307693 A1 | 11/2013 | Stone et al. | |
| 2014/0052315 A1 | 2/2014 | Isailovski et al. | |
| 2014/0189820 A1 | 7/2014 | Pieczul et al. | |
| 2014/0285337 A1 | 9/2014 | Gebhardt | |
| 2014/0289868 A1 | 9/2014 | Byrne et al. | |
| 2014/0347481 A1 | 11/2014 | Kostrzewski et al. | |
| 2015/0009331 A1 | 1/2015 | Venkatraman | |
| 2015/0094885 A1 | 4/2015 | Dargy et al. | |
| 2015/0149118 A1 | 5/2015 | Jordan et al. | |
| 2015/0185090 A1 | 7/2015 | Groeneweg et al. | |
| 2015/0221141 A1 | 8/2015 | Negritto | |
| 2015/0225002 A1 | 8/2015 | Branka et al. | |
| 2015/0261974 A1 | 9/2015 | Kirigin et al. | |
| 2015/0339863 A1 | 11/2015 | Allwardt et al. | |
| 2015/0363981 A1 | 12/2015 | Ziarno et al. | |
| 2016/0034526 A1* | 2/2016 | Pringuey | G06F 16/2425 707/721 |
| 2016/0046308 A1 | 2/2016 | Chung et al. | |
| 2016/0073025 A1 | 3/2016 | Cilia | |
| 2016/0073346 A1 | 3/2016 | Nicks et al. | |
| 2016/0075443 A1 | 3/2016 | Schmutz et al. | |
| 2016/0131483 A1 | 5/2016 | Jordan et al. | |
| 2017/0372404 A1* | 12/2017 | Wilczek | G06Q 30/0633 |
| 2019/0190868 A1* | 6/2019 | Zhong | H04L 51/18 |
| 2022/0086230 A1* | 3/2022 | Ho | H04L 67/12 |

FOREIGN PATENT DOCUMENTS

| | | |
|---|---|---|
| CN | 102123274 | 3/2013 |
| KR | 20150096203 | 8/2015 |
| WO | 2004019601 | 6/2004 |
| WO | 2006128124 | 11/2006 |
| WO | 2015150369 | 10/2015 |

* cited by examiner

REAL-TIME DATA ACQUISITION AND RECORDING DATA SHARING SYSTEM

CROSS-REFERENCE TO RELATED APPLICATION(S)

This application claims priority to U.S. Provisional Application No. 62/680,907, filed Jun. 5, 2018, claims priority to and is a continuation-in-part of U.S. Provisional Application No. 62/825,943, filed Mar. 29, 2019, claims priority to and is a continuation-in-part of U.S. Provisional Application No. 62/337,227, filed May 16, 2016, claims priority to and is a continuation-in-part of U.S. Non-provisional application Ser. No. 16/595,650, filed May 15, 2017, now U.S. Pat. No. 9,934,623, issued Apr. 3, 2018, claims priority to and is a continuation-in-part of U.S. Non-provisional application Ser. No. 15/907,486, filed Feb. 28, 2018, claims priority to and is a continuation-in-part of U.S. Provisional Application No. 62/337,225, filed May 16, 2016, claims priority to and is a continuation-in-part of U.S. Non-provisional application Ser. No. 15/595,689, filed May 15, 2017, claims priority to and is a continuation-in-part of U.S. Provisional Application No. 62/337,228, filed May 16, 2016, and claims priority to and is a continuation-in-part of U.S. Non-provisional application Ser. No. 15/595,712, filed May 15, 2017, to the extent allowed by law and the contents of which are incorporated herein by reference in their entireties.

TECHNICAL FIELD

This disclosure relates to a system and method for viewing video, images, and data from a real-time data acquisition and recording system and sharing the video, images, and/or data with other individuals.

BACKGROUND

High value mobile assets such as locomotives, aircraft, mass transit systems, mining equipment, transportable medical equipment, cargo, marine vessels, and military vessels typically employ onboard data acquisition and recording "black box" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, current and forecasted weather conditions and ambient conditions. In addition to the basic event and operational data, video and audio event/data recording capabilities are also deployed on many of these same mobile assets. Typically, data is extracted from data recorders, after an incident has occurred involving an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is unavailable and allows users to share the data, or portions thereof, with other authorized individuals.

SUMMARY

This disclosure relates generally to real-time data acquisition and recording systems used in high value mobile assets. The teachings herein can provide real-time, or near real-time, access to data, such as event and operational data, video data, and audio data, recorded by a real-time data acquisition and recording system. One implementation of a method for processing, storing, and transmitting data from at least one asset includes receiving, using a web server, a request from a first user, the request comprising specified data stored in a remote data repository and an email address of a second user; determining a uniform resource locator (URL) adapted to provide access to the specified data; generating an email comprising the URL; and sending the email to the email address.

Another implementation of a system for processing, storing, and transmitting data from at least one asset includes a web server adapted to receive a request from a first user, determine a uniform resource locator (URL) to provide access to the specified data, generate an email comprising the URL, and send the email to the email address, the request comprising specified data stored in a remote data repository and an email address of a second user; and a data recorder onboard the mobile asset comprising at least one local memory component, a data encoder, an onboard data manager, and a queueing repository, the data recorder adapted to receive data based on at least one data signal from at least one of at least one data source onboard the mobile asset and at least one data source remote from the mobile asset, and the data encoder adapted to encode encoded data based on the data.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
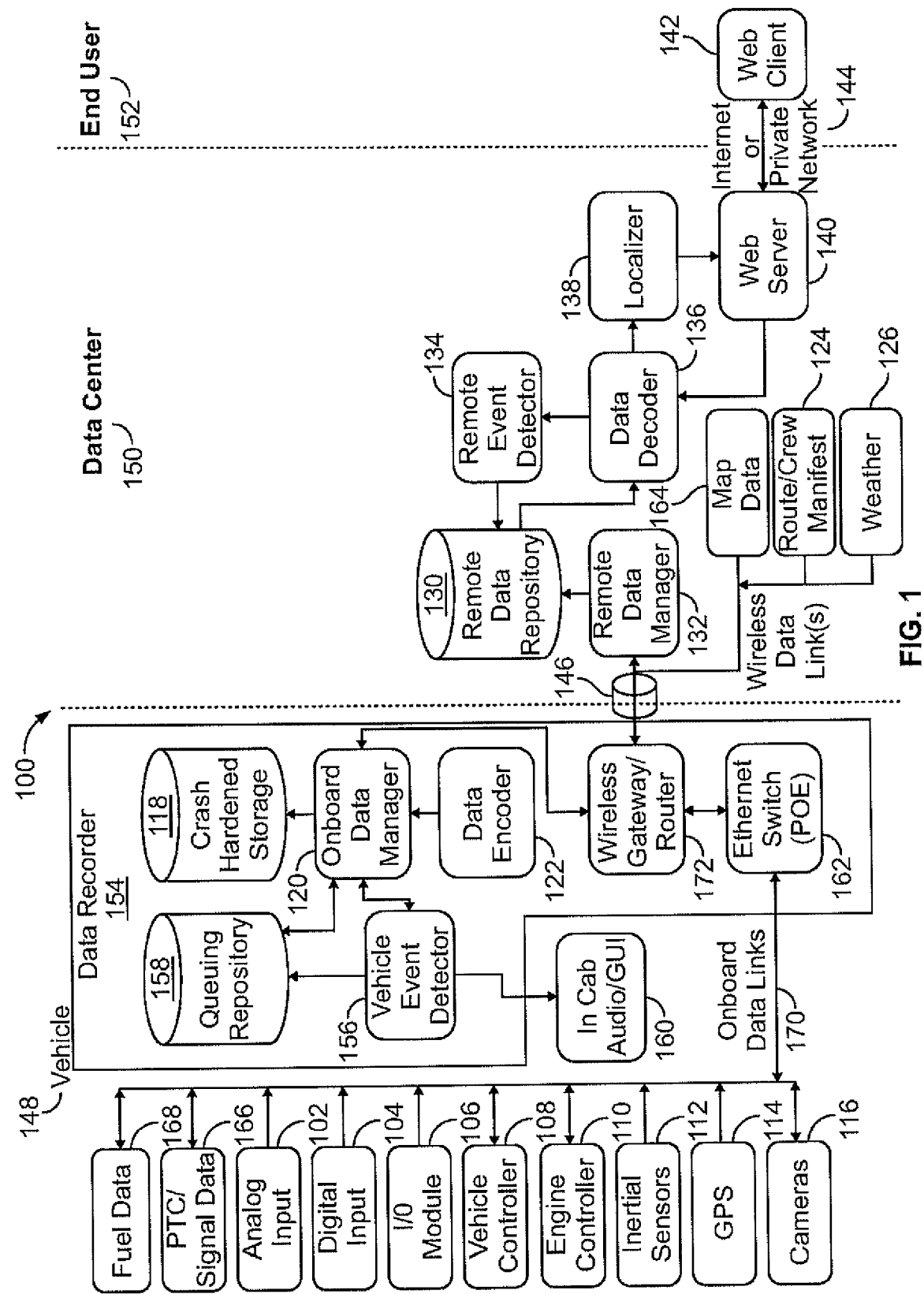
FIG. 1 illustrates a field implementation of a first embodiment of an exemplary real-time data acquisition and recording system in accordance with implementations of this disclosure.

A real-time data acquisition and recording data sharing system works in conjunction with a real-time data acquisition and recording system and a viewer which provides real-time, or near real-time, access to a wide range of data, such as event and operational data, video data, and audio data, of a high value asset, such as a locomotive for example, to remotely located users such as asset owners, operators and investigators. The data acquisition and recording system records data relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data acquisition and recording system on the asset to request a download of specific data, to locate and transfer files, and to use a custom application to view the data. The real-time data acquisition and recording system retains typical recording capability and adds the ability to stream data to a remote data repository and remote end users prior to, during, and after an incident.

A remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, real-time information and/or data can be used to audit crew performance and to aid network wide situational awareness.

The remotely located user may access a common web browser to use the viewer and navigate to desired data relating to a selected asset to view and analyze the operational efficiency and safety of assets in real-time or near real-time. The viewer provides the ability to view operations and/or 360 degree video in real-time, or near real-time, which enables rapid evaluation and adjustment of crew behavior. Owners, operators, and investigators can view and analyze the operational efficiency, safety of people, vehicles, and infrastructure and can investigate or inspect an incident. During an incident, for example, 360 degree video can facilitate triaging the situation and provide valuable information to first responders and investigators. During normal operation, for example, 360 degree video can be used to audit crew performance and to aid network wide situational awareness. Additionally, remotely located users can view 360 degree videos with the viewer in various modes through the use of a virtual reality device or through a standard web client, such as a web browser, thereby eliminating the need to download and use external applications to watch the video.

The data sharing system allows the user to share data obtained from the data acquisition and recording system to remotely located users. The user can share data with remote recipient end users that have internet access and a modern web browser in a secure, controlled, tracked, and audited way. The user, instead of sharing files, shares a URL to the data. URL based data sharing enables the user to control, track, and audit sensitive data. The user will be able to share data to improve the safety of the world's transportation systems without fear of unauthorized data dissemination. The data can be shared by investigators using the web client with remotely located users without the need to locate and download the "black box."

Data may include, but is not limited to, analog and frequency parameters such as speed, pressure, temperature, current, voltage, and acceleration which originate from the asset and/or nearby assets, Boolean data such as switch positions, actuator position, warning light illumination, and actuator commands, global positioning system (GPS) data and/or geographic information system (GIS) data such as position, speed, and altitude, internally generated information such as the regulatory speed limit for an asset given its current position, video and image information from cameras located at various locations in, on or in the vicinity of the asset, audio information from microphones located at various locations in, on or in vicinity of the asset, information about the operational plan for the asset that is sent to the asset from a data center such as route, schedule, and cargo manifest information, information about the environmental conditions, including current and forecasted weather conditions, of the area in which the asset is currently operating in or is planned to operate in, asset control status and operational data generated by systems such as positive train control (PTC) in locomotives, and data derived from a combination from any of the above including, but not limited to, additional data, video, and audio analysis and analytics.

Figure 2:
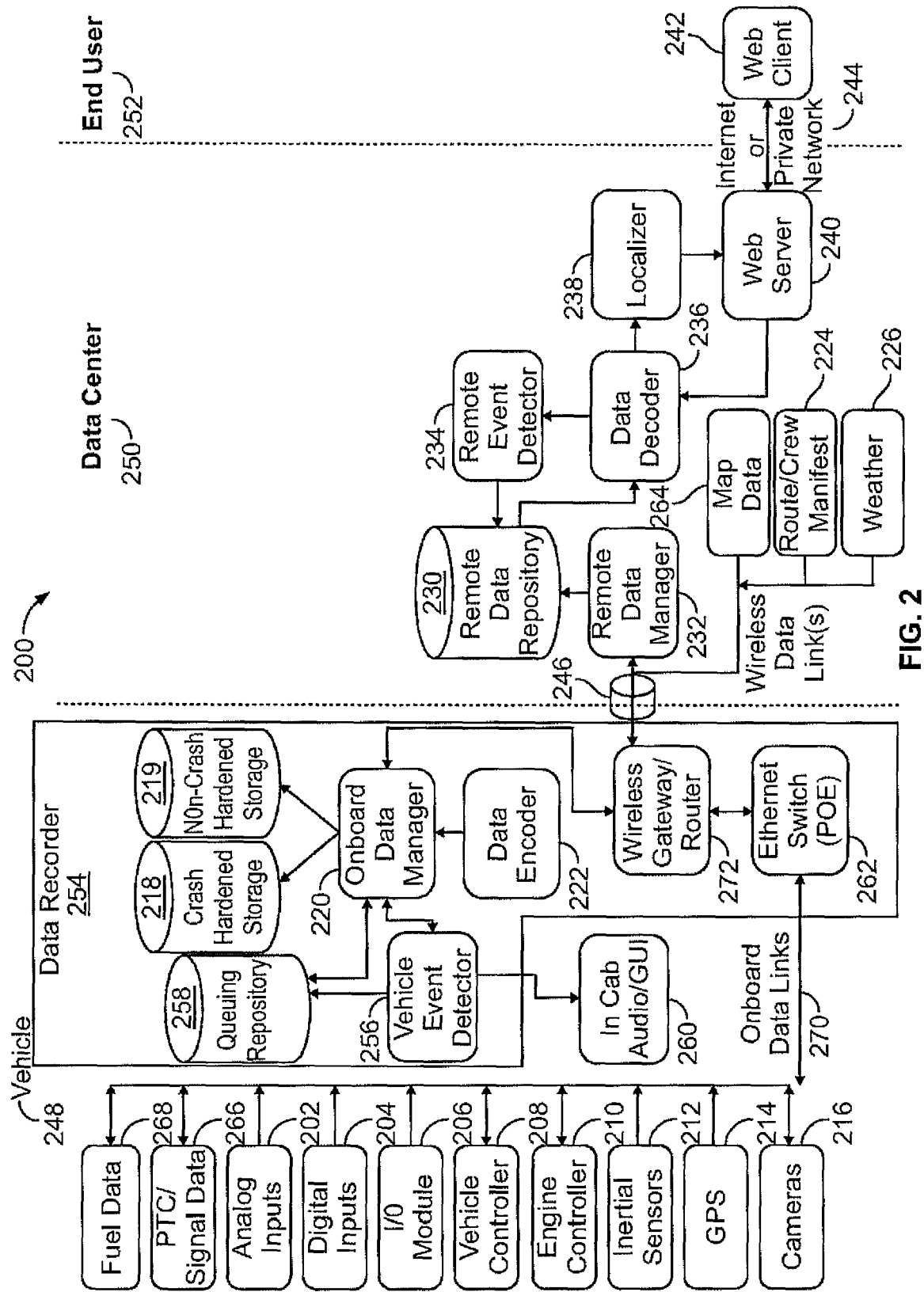
FIG. 2 illustrates a field implementation of a second embodiment of the exemplary real-time data acquisition and recording system in accordance with implementations of this disclosure.

FIGS. 1 and 2 illustrate a field implementation of a first embodiment and a second embodiment, respectively, of an exemplary real-time data acquisition and recording system (DARS) 100, 200 in which aspects of the disclosure can be implemented. DARS 100, 200 includes a data recorder 154, 254 that is installed on a vehicle or mobile asset 148, 248 and communicates with any number of various information sources through any combination of onboard wired and/or wireless data links 170, 270, such as a wireless gateway/router, or off board information sources via a data center 150, 250 of DARS 100, 200 via data links such as wireless data links 146. Data recorder 154, 254 comprises an onboard data manager 120, 220, a data encoder 122, 222, a vehicle event detector 156, 256, a queueing repository 158, 258, and a wireless gateway/router 172, 272. Additionally, in this implementation, data recorder 154, 254 can include a crash hardened memory module 118, 218 and/or an Ethernet switch 162, 262 with or without power over Ethernet (POE). An exemplary hardened memory module 118, 218 can be, for example, a crashworthy event recorder memory module that complies with the Code of Federal Regulations and the Federal Railroad Administration regulations, a crash survivable memory unit that complies with the Code of Federal Regulations and the Federal Aviation Administration regulations, a crash hardened memory module in compliance with any applicable Code of Federal Regulations, or any other suitable hardened memory device as is known in the art. In the second embodiment, shown in FIG. 2, the data recorder 254 can further include an optional non-crash hardened removable storage device 219.

The wired and/or wireless data links 170, 270 can include any one of or combination of discrete signal inputs, standard or proprietary Ethernet, serial connections, and wireless connections. Ethernet connected devices may utilize the data recorder's 154, 254 Ethernet switch 162, 262 and can utilize POE. Ethernet switch 162, 262 may be internal or external and may support POE. Additionally, data from remote data sources, such as a map component 164, 264, a route/crew manifest component 124, 224, and a weather component 126, 226 in the implementation of FIGS. 1 and 2, is available to the onboard data manager 120, 220 and the vehicle event detector 156, 256 from the data center 150, 250 through the wireless data link 146, 246 and the wireless gateway/router 172, 272.

Data recorder 154, 254 gathers data or information from a wide variety of sources, which can vary widely based on the asset's configuration, through onboard data links 170, 270. The data encoder 122, 222 encodes at least a minimum set of data that is typically defined by a regulatory agency. In this implementation, the data encoder 122, 222 receives data from a wide variety of asset 148, 248 sources and data center 150, 250 sources. Information sources can include any number of components in the asset 148, 248, such as any of analog inputs 102, 202, digital inputs 104, 204, I/O module 106, 206, vehicle controller 108, 208, engine controller 110, 210, inertial sensors 112, 212, global positioning system (GPS) 114, 214, cameras 116, 216, positive train control (PTC)/signal data 166, 266, fuel data 168, 268, cellular transmission detectors (not shown), internally driven data and any additional data signals, and any of number of components in the data center 150, 250, such as any of the route/crew manifest component 124, 224, the weather component 126, 226, the map component 164, 264, and any additional data signals. The cameras 116, 216, or image measuring devices and/or video measuring devices, include, but are not limited to, 360 degrees cameras, fixed cameras, narrow view cameras, wide view cameras, 360 degrees fisheye view cameras, and/or other cameras inside and outside the asset 148. The data encoder 122, 222 compresses or encodes the data and time synchronizes the data in order to facilitate efficient real-time transmission and replication to a remote data repository 130, 230. The data encoder 122, 222 transmits the encoded data to the onboard data manager 120, 220 which then saves the encoded data in the crash hardened memory module 118, 218 and the queuing repository 158, 258 for replication to the remote data repository 130, 230 via a remote data manager 132, 232 located in the data center 150, 250. Optionally, the onboard data manager 120, 220 can save a tertiary copy of the encoded data in the non-crash hardened removable storage device 219 of the second embodiment shown in FIG. 2. The onboard data manager 120, 220 and the remote data manager 132, 232 work in unison to manage the data replication process. A single remote data manager 132, 232 in the data center 150, 250 can manage the replication of data from a plurality of assets 148, 248.

The data from the various input components and data from an in-cab audio/graphic user interface (GUI) 160, 260 are sent to a vehicle event detector 156, 256. The vehicle event detector 156, 256 processes the data to determine whether an event, incident or other predefined situation involving the asset 148, 248 has occurred. When the vehicle event detector 156, 256 detects signals that indicate a predefined event occurred, the vehicle event detector 156, 256 sends the processed data that a predefined event occurred along with supporting data surrounding the predefined event to the onboard data manager 120, 220. The vehicle event detector 156, 256 detects events based on data from a wide variety of sources, such as the analog inputs 102, 202, the digital inputs 104, 204, the I/O module 106, 206, the vehicle controller 108, 208, the engine controller 110, 210, the inertial sensors 112, 212, the GPS 114, 214, the cameras 116, 216, the route/crew manifest component 124, 224, the weather component 126, 226, the map component 164, 264, the PTC/signal data 166, 266, and the fuel data 168, 268, which can vary based on the asset's configuration. When the vehicle event detector 156, 256 detects an event, the detected asset event information is stored in a queuing repository 158, 258 and can optionally be presented to the crew of the asset 148, 248 via the in-cab audio/graphical user interface (GUI) 160, 260.

The onboard data manager 120, 220 also sends data to the queuing repository 158. In near real-time mode, the onboard data manager 120, 220 stores the encoded data received from the data encoder 122, 222 and any event information in the crash hardened memory module 118, 218 and in the queueing repository 158, 258. In the second embodiment of FIG. 2, the onboard data manager 220 can optionally store the encoded data in the non-crash hardened removable storage device 219. After five minutes of encoded data has accumulated in the queuing repository 158, 258, the onboard data manager 120, 220 stores the five minutes of encoded data to the remote data repository 130, 230 via the remote data manager 132, 232 in the data center 150, 250 over the wireless data link 146, 256 accessed through the wireless gateway/router 172, 272. In real-time mode, the onboard data manager 120, 220 stores the encoded data received from the data encoder 122, 222 and any event information to the crash hardened memory module 118, 218, and optionally in the non-crash hardened removable storage device 219 of FIG. 2, and to the remote data repository 130, 230 via the remote data manager 132, 232 in the data center 150, 250 over the wireless data link 146, 246 accessed through the wireless gateway/router 172, 272. The onboard data manager 120, 220 and the remote data manager 132, 232 can communicate over a variety of wireless communications links, such as Wi-Fi, cellular, satellite, and private wireless systems utilizing the wireless gateway/router 172, 272. Wireless data link 146, 246 can be, for example, a wireless local area network (WLAN), wireless metropolitan area network (WMAN), wireless wide area network (WWAN), a private wireless system, a cellular telephone network or any other means of transferring data from the data recorder 154, 254 of DARS 100, 200 to, in this example, the remote data manager 130, 230 of DARS 100, 200. When a wireless data connection is not available, the data is stored in memory and queued in queueing repository 158, 258 until wireless connectivity is restored and the data replication process can resume.

In parallel with data recording, data recorder 154, 254 continuously and autonomously replicates data to the remote data repository 130, 230. The replication process has two modes, a real-time mode and a near real-time mode. In real-time mode, the data is replicated to the remote data repository 130, 230 every second. In near real-time mode, the data is replicated to the remote data repository 130, 230 every five minutes. The rate used for near real-time mode is configurable and the rate used for real-time mode can be adjusted to support high resolution data by replicating data to the remote data repository 130, 230 every 0.10 seconds. When the DARS 100, 200 is in near real-time mode, the onboard data manager 120, 220 queues data in the queuing repository 158, 258 before replicating the data to the remote data manager 132, 232. The onboard data manager 120, 220 also replicates the vehicle event detector information queued in the queueing repository 158, 258 to the remote data manager 132, 232. Near real-time mode is used during normal operation, under most conditions, in order to improve the efficiency of the data replication process.

Real-time mode can be initiated based on events occurring and detected by the vehicle event detector 156, 256 onboard the asset 148, 248 or by a request initiated from the data center 150, 250. A typical data center 150, 250 initiated request for real-time mode is initiated when a remotely located user 152, 252 has requested real-time information from a web client 142, 242. A typical reason for real-time mode to originate onboard the asset 148, 248 is the detection of an event or incident by the vehicle event detector 156, 256 such as an operator initiating an emergency stop request, emergency braking activity, rapid acceleration or deceleration in any axis, or loss of input power to the data recorder 154, 254. When transitioning from near real-time mode to real-time mode, all data not yet replicated to the remote data repository 130, 230 is replicated and stored in the remote data repository 130, 230 and then live replication is initiated. The transition between near real-time mode and real-time mode typically occurs in less than five seconds. After a predetermined amount of time has passed since the event or incident, a predetermined amount of time of inactivity, or when the user 152, 252 no longer desires real-time information from the asset 148, 248, the data recorder 154, 254 reverts to near real-time mode. The predetermined amount of time required to initiate the transition is configurable and is typically set to ten minutes.

When the data recorder 154, 254 is in real-time mode, the onboard data manager 120, 220 attempts to continuously empty its queue to the remote data manager 132, 232, storing the data to the crash hardened memory module 118, 218, and optionally to the non-crash hardened removable storage device 219 of FIG. 2, and sending the data to the remote data manager 132, 232 simultaneously. The onboard data manager 120, 220 also sends the detected vehicle information queued in the queuing repository 158, 258 to the remote data manager 132, 232.

Upon receiving data to be replicated from the data recorder 154, 254, along with data from the map component 164, 264, the route/crew manifest component 124, 224, and the weather component 126, 226, the remote data manager 132, 232 stores the compressed data to the remote data repository 130, 230 in the data center 150, 250 of DARS 100, 200. The remote data repository 130, 230 can be, for example, cloud-based data storage or any other suitable remote data storage. When data is received, a process is initiated that causes a data decoder 136, 236 to decode the recently replicated data for/from the remote data repository 130, 230 and send the decoded data to a remote event detector 134, 234. The remote data manager 132, 232 stores vehicle event information in the remote data repository 130, 230. When the remote event detector 134, 234 receives the decoded data, it processes the decoded data to determine if an event of interest is found in the decoded data. The decoded information is then used by the remote event detector 134, 234 to detect events, incidents, or other predefined situations, in the data occurring with the asset 148, 248. Upon detecting an event of interest from the decoded data previously stored in the remote data repository 130, 230, the remote event detector 134, 234 stores the event information and supporting data in the remote data repository 130, 230. When the remote data manager 132, 232 receives remote event detector 134, 234 information, the remote data manager 132, 232 stores the information in the remote data repository 130, 230.

The remotely located user 152, 252 can access information, including vehicle event detector information, relating to the specific asset 148, 248, or a plurality of assets, using the standard web client 142, 242, such as a web browser, or a virtual reality device (not shown) which, in this implementation, can display thumbnail images from selected cameras. The web client 142, 242 communicates the user's 152, 252 request for information to a web server 140, 240 through a network 144, 244 using common web standards, protocols, and techniques. Network 144, 244 can be, for example, the Internet. Network 144, 244 can also be a local area network (LAN), metropolitan area network (MAN), wide area network (WAN), virtual private network (VPN), a cellular telephone network or any other means of transferring data from the web server 140, 240 to, in this example, the web client 142, 242. The web server 140, 240 requests the desired data from the data decoder 136, 236. The data decoder 136, 236 obtains the requested data relating to the specific asset 148, 248, or a plurality of assets, from the remote data repository 130, 230 upon request from the web server 140, 240. The data decoder 136, 236 decodes the requested data and sends the decoded data to a localizer 138, 238. Localization is the process of converting data to formats desired by the end user, such as converting the data to the user's preferred language and units of measure. The localizer 138, 238 identifies the profile settings set by user 152, 252 by accessing the web client 142, 242 and uses the profile settings to prepare the information being sent to the web client 142, 242 for presentation to the user 152, 252, as the raw encoded data and detected event information is saved to the remote data repository 130, 230 using coordinated universal time (UTC) and international system of units (SI units). The localizer 138, 238 converts the decoded data into a format desired by the user 152, 252, such as the user's 152, 252 preferred language and units of measure. The localizer 138, 238 sends the localized data in the user's 152, 252 preferred format to the web server 140, 240 as requested. The web server 140, 240 then sends the localized data of the asset, or plurality of assets, to the web client 142, 242 for viewing and analysis, providing playback and real-time display of standard video and 360 degree video through the viewer. The web client 142, 242 can display and the user 152, 252 can view the data, video, and audio for a single asset or simultaneously view the data, video, and audio for a plurality of assets. The web client 142, 242 can also provide synchronous playback and real-time display of data along with the plurality of video and audio data from both standard and 360 degree video sources on, in, or in the vicinity of the asset, nearby assets, and/or remotely located sites. The web client 142, 242 can play the video data on the viewer for the user 152, 252 who can interact with the video for viewing and analysis. The user 152, 252 can also download the video data using the web client 142, 242 and can then use the virtual reality device to interact with the video data on the viewer for viewing and analysis.

The web client 142, 242 is enhanced with a software application that provides the playback of video data and/or 360 degree video, in a variety of different modes. The user 152, 252 can elect the mode in which the software application presents the video playback such as, for example, fisheye view, dewarped panorama view, dewarped double panorama view, and dewarped quad view.

The user 152, 252 can further share data with remotely located recipient end users that have internet access and a modern web browser in a secure, controlled, tracked, and audited way using the data sharing system of the present disclosure. The user 152, 252, instead of sharing files, shares a URL to the data. URL based data sharing enables the user to control, track, and audit sensitive data. The user will be able to share data to improve the safety of the world's transportation systems without fear of unauthorized data dissemination. An administrator has permission to increase and/or decrease the native permissions of the user 152, 252 and each remotely located recipient end user. The native permission of the user 152, 252 and each remotely located recipient end user determines the permissions that the particular remotely located recipient end user has to view data on the web client 142, 242. The data sharing system is used by asset 148, 248 owners, operators, and investigators to share real-time data about operational efficiency and safety of vehicles. The sharing of data enables rapid evaluation and adjustment of behavior.

Figure 3:
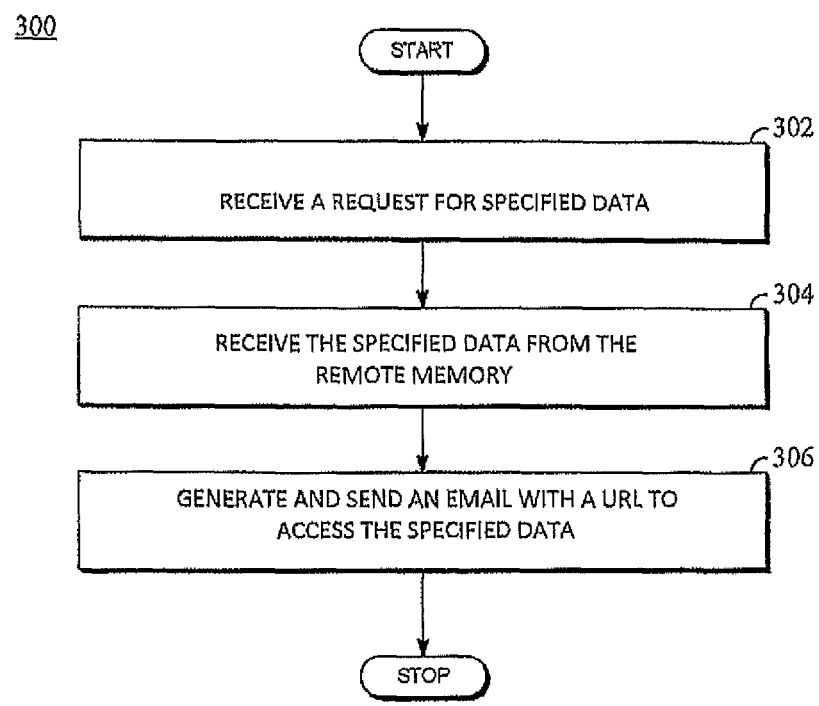
FIG. 3 is a flow diagram of a process for sharing data and/or information from the asset 148, 248 through a web browser or virtual reality device in accordance with implementations of this disclosure.

FIG. 3 is a flow diagram showing a process 300 for sharing data and/or information from the asset 148, 248 through a web browser or virtual reality device. Typically, the user 152, 252 will request that the data center 150, 250 share asset 148, 248 data using the web client 142, 242 302 (FIG. 3). A typical reason for data sharing is the detection of an incident, such as an operator initiating an emergency stop request, emergency braking activity, rapid acceleration or deceleration in any axis, and/or loss of input power to DARS 100, 200. No file will be downloaded or sent to the remotely located recipient end user. User 152, 252 will not be able to share more than what their native permission on the web client 142, 242 allows. The remotely located recipient end user will be able to see data based on their own native permissions on the web client 142, 242. Such sharing activity is logged by the web client 142, 242 in the data center 150, 250. The administrator is able to share data to a plurality of users 152, 252 who natively do not have access to the data through the web client 142, 242 using permission escalation. Such permission escalation activity will also be logged by the web client 142, 242 in the data center 150, 250.

As previously discussed, the user 152, 252 accesses information, including vehicle event detector 156, 256 information, using the web client 142, 242. Using common web standards, protocols, and techniques, such as internet or private network 144, 244, the web client 142, 242 communicates with the web server 140, 240 the information desired by the user 152, 252. The web server 140, 240 requests the desired data from the data decoder 136, 236. Data is extracted by the data decoder 136, 236 and then the data is localized by the localizer 138, 238, converting the data to formats desired by the user 152, 252 as described above. The web server 140, 240 then sends the localized data to the web client 142, 242 for viewing and analysis 304 (FIG. 3).

The sharer end user 152, 252 can share this information with a plurality of remotely located recipient end users, including vehicle event detector 156, 256 information and video data using the web client 142, 242, regardless of whether the recipient end user has a pre-registered account on the web client 142, 242. The sharer end user 152, 252 can share the information and data with a plurality of remotely located recipient end users regardless of whether the recipient end user has a pre-registered account on the web client 142, 242. During this process the web client 142, 242 will generate an email with a URL that points to the data in the data center 150, 250 306 (FIG. 3). The remotely located recipient end user receives the email with the URL address to access the data. The URL address is not a link to files. No files are shared with the recipient end users. The data is not a discrete file, but a range of data pulled from the remote data repository 15 based on the shared web-based viewer link. The URL address sent via email is a link to the web-based viewer that allows the recipient end user to view a specific segment of data synchronized with still images and video via the web-based viewer. When the remotely located recipient end user clicks on the URL, they will be able to access the shared information using their own web client 142, 242 and the sharing activity will be logged by the web client 142, 242 in the data center 150, 250.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for providing access to view data from at least one mobile asset comprising:

receiving, using a data recorder onboard the mobile asset, the data based on at least one data signal from at least one of at least one data source onboard the mobile asset and at least one data source remote from the mobile asset;

encoding, using a data encoder of the data recorder, a predetermined amount of the data into encoded data;

appending, using an onboard data manager of the data recorder, the encoded data to a data segment;

storing, using the onboard data manager of the data recorder, at least one of the encoded data and the data segment at a configurable first predetermined rate in at least one local memory component of the data recorder;

sending, using the onboard data manager of the data recorder, at least one of the encoded data and the data segment to a remote data manager remote from the at least one mobile asset via a wireless data link at a configurable second predetermined rate;

storing, using the remote data manager, at least one of the encoded data and the data segment to a remote data repository;

receiving, using a web server, a request from a first user, the request comprising at least one email address of at least one second user and specified data selected by the first user stored in the remote data repository;

identifying the specified data in the remote data repository;

determining a uniform resource locator (URL) comprising a shared web-based viewer link adapted to provide access to view the specified data on a first condition that the first user comprises first native permissions allowing access to the specified data;

generating an email comprising the URL; and sending, using the web server, the email to the at least one email address.

2. The method of claim 1, further comprising:
displaying the specified data on a web browser of the at least one second user when the second user selects the URL provided in the email on a second condition that the second user comprises second native permissions allowing access to view the specified data.

3. The method of claim 1, further comprising:
requesting, using the web server, the specified data from a data decoder; and decoding, using the data decoder, the specified data.

4. The method of claim 3, further comprising:
processing, using a localizer, the specified data into processed specified data comprising a predetermined language and at least one predetermined unit of measurement.

5. The method of claim 1, further comprising:
storing, using a web client, a record in the remote data repository, the record comprising at least one of the email, the URL, the specified data, the first user, and the second user.

6. The method of claim 1, wherein:
the at least one data source onboard the mobile asset includes at least one of analog inputs, digital inputs, input and output modules, vehicle controller, engine controller, inertial sensors, global positioning system, at least one camera, fuel data, positive train control (PTC) signal data, 360 degrees camera, fixed camera, narrow view camera, wide view camera, and 360 degrees fisheye view camera and wherein the at least one data source remote from the mobile asset includes at least one of map components, route and crew manifest component, weather component, 360 degrees camera, fixed camera, narrow view camera, wide view camera, and 360 degrees fisheye view camera; and
the data includes at least one of speed, pressure, temperature, current, voltage, acceleration from the mobile asset, acceleration from remote mobile assets, switch positions, actuator positions, warning light illumination, actuator commands, position, altitude, internally generated information, video information, audio information, route, schedule, cargo manifest information, environmental conditions, current weather conditions, and forecasted weather conditions.

7. A system for providing access to view data from at least one mobile asset comprising:
a data recorder onboard the mobile asset comprising at least one local memory component, a data encoder, an onboard data manager, and a queueing repository, the data recorder adapted to receive the data based on at least one data signal from at least one of:
at least one data source onboard the mobile asset; and
at least one data source remote from the mobile asset;
the data encoder adapted to encode a predetermined amount of the data into encoded data;
the onboard data manager adapted to:
append the encoded data to a data segment;
store at least one of the encoded data and the data segment at a configurable first predetermined rate in at least one of the at least one local memory component and the queueing repository; and
sending at least one of the encoded data and the data segment to a remote data manager remote from the at least one mobile asset via a wireless data link at a configurable second predetermined rate, wherein the second predetermined rate is in the range of and including zero seconds and one second, the remote data manager adapted to store at least one of the encoded data and the data segment to a remote data repository remote from the at least one mobile asset;
a web server adapted to receive a request from a first user, determine a uniform resource locator (URL) comprising a shared web-based viewer link adapted to provide access to view the specified data selected by the first user on a first condition that the first user comprises first native permissions allowing access to the specified data, generate an email comprising the URL, and send the email to at least one email address of at least one second user, the request comprising the at least one email address of the at least one second user and specified data stored in the remote data repository.

8. The system of claim 7, further comprising:
a remote data decoder adapted to decode the specified data into decoded data.

9. The system of claim 7, further comprising:
a localizer adapted to process the specified data into processed specified data comprising a predetermined language and at least one predetermined unit of measurement.

10. The system of claim 7, further comprising:
a web client adapted to store a record in the remote data repository, the record comprising at least one of the URL, the specified data, the first user, an email address of the first user, the at least one second user, and the at least one email address of the at least one second user.

11. The method of claim 1, wherein an administrator can at least one of increase and decrease at least one of the first native permissions of the first user and the second native permissions of the at least one second user.

12. The method of claim 1, wherein the first user can request the specified data and the at least one second user can view the specified data on a condition that an administrator escalates at least one of the first native permission and the second native permissions.

13. The method of claim 1, further comprising:
sending the request for the specified data from a first web client of the first user to the web server;
requesting, using the web server, the specified data from a data decoder;
decoding, using the data decoder, the specified data into decoded specified data; and
processing, using a localizer, the decoded specified data into processed specified data comprising a predetermined language and at least one predetermined unit of measurement.

14. The method of claim 1, wherein the first user can share the URL with a plurality of remotely located recipient end users.

15. The method of claim 1, wherein the at least one second user does not need to have a preregistered account.

16. The system of claim 7, further comprising:
a first web client adapted to send the request for the specified data selected by the first user to the web server, the web server adapted to request the specified from a data decoder, the data decoder adapted to decode the specified data into decoded specified data; and
a localizer adapted to process the decoded specified data into processed specified data comprising a predetermined language and at least one predetermined unit of measure.

17. The system of claim 7, wherein the first user can share the URL with a plurality of remotely located recipient end users.

18. The system of claim 7, wherein the at least one second user does not need to have a preregistered account.

19. The system of claim 7, further comprising:
at least one second web client adapted to display the specified data on a web browser associated with the at least one second user when the at least one second user selects the URL provided in the email on a second condition that the at least one second user comprises second native permissions allowing access to view the specified data.

20. The system of claim 7, wherein an administrator can at least one of increase and decrease at least one of the first native permissions of the first user and the second native permissions of the at least one second user.

21. The system of claim 1, wherein the first user can request the specified data and the at least one second user can view the specified data on a condition that an administrator escalates at least one of the first native permissions and the second native permissions.

* * * * *